3,050,413
QUICK DRYING PRINTING INK FOR COATING MATERIALS AND METHOD OF DRYING SAME
Benjamin L. Sites, Elmhurst, and Meyer S. Agruss, Chicago, Ill., assignors to Miehle-Goss-Dexter, Incorporated, a corporation of Delaware
No Drawing. Filed Feb. 1, 1956, Ser. No. 562,671
17 Claims. (Cl. 117—93)

This invention relates to the art of coating materials. It has particular reference to an improved quick-drying vehicle of the drying oil type for various coatings, and to an improved method for rapidly indurating or drying such a vehicle after the coating operation.

A flow diagram of the method is as follows:

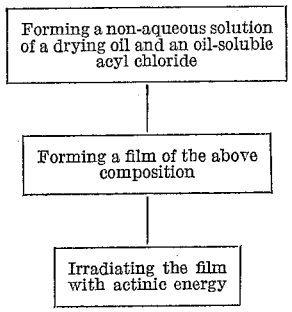

The invention is applicable generally to coating materials utilizing a drying oil type of vehicle, where quick drying of the vehicle is desired. The term coating materials is intended to cover such vehicles or materials which embrace the characteristics of the subject invention and which may have applications in fields other than those specifically mentioned herein, such as, for example, photosensitive resists for use in the Graphic Arts, plugging materials for use in the drilling operations encountered in the petroleum industries, and the like. However, for illustrative purposes, and with no intent to limit its field of use, the invention will be described with particular reference to printing, wherein the coat-forming material is applied by a conventional printing plate.

Printing inks as made heretofore generally consist mainly of a non-aqueous vehicle, namely a drying oil, pigmented to the desired color. For some purposes the printing ink does not contain a pigment, for example in over-printing. The drying oils commonly used for printing inks, such as tung oil, linseed oil, rape seed oil, and dehydrated castor oil, have by nature a drying rate which is slow compared to the potential operating speeds of printing presses, even when the usual driers (e.g. cobalt) are added to the oils. Particularly with the advent of the higher speed presses and multiple color printing, the avoidance of smudges and off-set on the successive sheets coming from the printing press has presented a serious problem.

While numerous attempts have been made to solve this problem, none of them, as far as we are aware, can be regarded as satisfactory. For example, the use of heat-set inks and steam-set inks, which were developed for this purpose, require the addition of large and expensive accessory equipment to the printing press in order to utilize the full productivity of the press; and the heat or steam tend to impair the dimensional stability of the paper and therefore the quality of the finished printed matter. The use of fine powder sprays or a transparent protective coating over the freshly printed surface (see Costello Patent No. 2,696,168, dated December 7, 1954), also requires considerable accessory equipment and is generally inconvenient.

It has also been proposed to increase the drying rate of printing inks by employing a catalyst or polymerization promoter for speeding up the drying of the vehicle, sometimes in conjunction with heat or radiation of certain light energy. These proposals likewise involve objectionable features which have barred or greatly limited their commercial use. For example, a printing ink containing a diacyl peroxide as the catalyst will undergo skinning and livering even after a short period of storage under ordinary conditions, due to the strong oxidizing effect of this peroxide on the eleostearin of the drying oil, as disclosed in Hooft Patent No. 2,109,774, dated March 1, 1938. Thus, Hooft proposed to apply the diacyl peroxide to the paper separately from the ink, which entails obvious disadvantages in commercial printing. Wendt Patents Nos. 2,453,769 and 2,453,770 disclose printing inks containing certain methane derivatives for promoting polymerization of the drying oil, and irradiation of the printed material with ultra violet light of certain wave lengths; but this expedient is admittedly unsuitable when a heat bodied tung oil is used as the vehicle, and the use of pure eleostearin as suggested by Wendt will obviously result in an unstable product having too short a shelf life for commercial purposes.

The principal object of the present invention is to provide a quick-drying vehicle of the drying oil type and a method for rapidly indurating or drying such a vehicle. Another object is to provide a quick-drying printing ink and printing method which enable the printing press to operate at maximum speed with no smudging or off-setting on the successively printed sheets, and without impairing the dimensional stability of the paper. Further objects are to provide a quick-drying ink containing a polymerization promoter activated by ultra-violet light, or other forms of actinic energy, and to provide an ink of this character which is stable in that it can be stored for a long period of time under ordinary conditions without livering. (While we have referred in the above to sheet-fed presses, it will be understood that the invention is also applicable to web-fed presses.)

By a vehicle of the "drying oil type" we mean a vehicle containing a drying oil binder having a conjugated system of double bonds. By "quick-drying" we mean that when the vehicle containing the ink pigment or other material is applied in a thin film (about 2 to 4 microns in thickness) as in printing, it will dry or set in a matter of seconds; that is, the surface of the film when irradiated up to about 20 seconds with actinic energy, preferably ultra-violet light, becomes sufficiently dry so that in the case of a printing ink, for example, it will not off-set on succeeding sheets coming from the press. However, the drying action does not stop after the ultra-violet or activating energy is removed. On the contrary, in the practice of the present invention we have found that within a period of up to about 30 seconds after such removal of the activating energy, the polymerization or drying action has penetrated the entire film to provide a film which is hard throughout. On the other hand, a film of the same thickness consisting of the vehicle alone, when irradiated for the same period of time with the ultra-violet light, will dry through the entire depth of the film in this short period of irradiation, there being no inert pigment in the vehicle to slow down the polymerization rate.

The quick-drying vehicle of the present invention is non-aqueous and consists essentially of a drying oil binder having a conjugated system of double-bonds and an acyl chloride catalyst. We have found that compounds in this group act as catalyst to promote a rapid polymerization of the binder when a film or coating of the vehicle is irradiated with actinic energy, such as, for example ultra-violet light. The latter thus constitues an activating means for triggering a reaction in which the catalyst readily absorbs ultra-violet light to form free radicals which, in turn, form free radicals with the binder of the vehicle. This provides a rapid reaction which completes the polymerization or drying of the vehicle in a matter of seconds.

We have further found that these compounds will not cause livering of the vehicle and in many cases will not cause skinning. Accordingly, the invention makes possible the formulation of vehicles having a long shelf life.

The binder may be any of the drying oils commonly used in printing inks and containing conjugated unsaturation, or a mixture of two or more such oils. Bodied tung oil is preferred as the conjugatedly unsaturated drying oil. As indicated above, however, the binder may comprise a conjugatedly unsaturated drying oil, such as, tung oil and a portion of non-conjugatedly unsaturated drying oil. If the binder contains less than about 30% conjugated unsaturation, the vehicle will not undergo the rapid and complete polymerization which is preferred for the purpose of the invention.

The proportions of catalyst and drying oil binder in the vehicle are not critical, but we have found that for best results the catalyst should be present in an amount which is approximately 2–8% by weight of the binder.

The ultra-violet light used to trigger the polymerization reaction is preferably the full spectrum of ultra-violet, including 1800 A. to 4000 A., as we have found that isolated bands of the spectrum do not provide as rapid a polymerization as the full spectrum. An example of such a light source is a high pressure electronic discharge quartz mercury arc tube having an active length of about 1½ inches and drawing about 100 watts, the ultra-violet intensity of radiations of 3130 A. and shorter, measured at 20 inches distance, being over 250 microwatts per square centimeter.

The method of the invention comprises essentially the rapid induration of the drying oil binder by (1) forming a non-aqueous solution of the binder and the catalyst compound, (2) forming a film of the resulting vehicle, and (3) irradiating the film with actinic energy (preferably ultra-violet light) adapted to activate the catalyst to form free radicals.

In the preferred practice of the invention, the vehicle containing a pigment in the desired proportion is applied in any suitable manner in a film to the material to be coated such as a paper, and is then irradiated with the ultra-violet light to trigger the polymerization reaction.

In the case of printing, the printing ink comprises the vehicle and the pigment, if desired, suspended in the vehicle. The ink is applied in the usual manner by the printing press, and the source of ultra-violet light is positioned to irradiate the printed surfaces of the successive sheets coming from the press.

The following are examples of acyl chloride compounds used in the new vehicle. In each case, the compound was mixed with bodied tung oil to form a vehicle containing 4% of the compound and 96% tung oil, by weight. A few drops of each vehicle were placed upon a glass microscope slide and spread out to a thin film with an accurately honed steel depth gage, so that the thickness of the various films was substantially uniform for comparative purposes; and in each case, the thin film on glass was placed one inch away from the ultra-violet source previously described and timed for complete polymerization to take place. The number of seconds required for the vehicle to polymerize or dry to a hard film, starting with the inception of the irradiation, is given for each compound. For comparative purposes, it was found that a similar film of bodied tung oil by itself required 95 seconds of similar irradiation before polymerizing to a hard film.

Table I

| I | R¹ | W | X | Y | Z | R² | Catalyst Compound | Seconds to Dry |
|---|---|---|---|---|---|---|---|---|
| II | | $C_6H_5$—CH= | =CH— | | —CO— | —Cl | Cinnamoyl Chloride | 1 |
| III | | $CH_3$—O— | | | $C_6H_4$—CO— | —Cl | Anisoyl Chloride | 3 |
| IV | | $C_6H_5$—CO— | | | | —Cl | Benzoyl Chloride | 4 |
| V | Cl— | CO—$CH_2$— | | | —$CH_2$—CO— | —Cl | Succinyl Chloride | 3 |
| VI | | $CH_3$—CH= | =CH— | | —CO— | —Cl | Crotonyl Chloride | 4 |

In all of the compounds identified in the foregoing table, it will be observed that the acyl chlorides of the cinnamo-radical are the most effective. It will be understood that mixtures of two or more of the catalyst compounds can also be used.

No skinning or livering was observed in any of these vehicles containing the compounds identified in the foregoing table.

We have found that a catalytic amount of organic peroxide may be added to the composition in the presence of acyl chloride without livering and substantial skinning of the composition occurring.

It was also determined that when a small amount of a cross-linking agent, such as divinyl benzene, is included in the vehicle, the hard film formed by irradiation with the whole spectrum of ultra-violet light is clear. A thin film of a vehicle having the following formula was formed and irradiated in the manner described in connection with the preceding examples and polymerized to a hard, clear film in ½ second of irradiation, and no skinning or livering of the vehicle was observed.

VII

96% bodied tung oil
1% divinylbenzene
1% benzoyl peroxide
2% cinnamoyl chloride

Other vehicles having the following compositions (by weight) were tested in the manner previously described. The number of seconds required to polymerize or dry the vehicle to a hard film, starting with the inception of the irradiation, is given for each composition.

VIII

96% bodied tung oil
2% benzoyl peroxide } 2 seconds.
2% 2,3-butanedione

IX

96% bodied tung oil
2% benzoyl peroxide } 2 seconds.
2% benzoin

X

96% bodied tung oil
2% benzoyl peroxide } ½ second.
2% cinnamoyl chloride

XI

96% bodied tung oil
2% benzoin } 4 seconds.
2% cinnamaldehyde

XII

98% bodied tung oil
2% benzoin } 5 seconds.
2% cinnamic acid

XIII

88% bodied tung oil
10% limed rosin } 1 second.
2% cinnamoyl chloride

The following are examples of printing inks made according to the invention. In each case, the ink was applied by a Lithoprint press to paper of standard stock, and the printed sheet was promptly irradiated with ultravoilet light. The ink of Example XIV would not offset after one second of such irradiation, and the ink of Example XV would not offset after ½ second of irradiation, whereas the non-irradiated inks would offset for several hours after printing. Neither ink showed skinning or livering after storage under ordinary conditions.

XIV

56% bodied tung oil
10% limed rosin
32% red toner
2% cinnamoyl chloride

XV

56% bodied tung oil
10% limed rosin
30% red toner
2% benzoyl peroxide
2% cinnamoyl chloride The following table shows the results of tests of various blends of bodied tung oil and aliphatic or aromatic acyl chlorides, the vehicle in each case containing 4% of the acyl chloride and 96% tung oil by weight. The test conditions were the same as described in connection with the Table I.

*Table II*

| Structure or Formula | Name | Seconds to Polymerize |
|---|---|---|
| $C_6H_5$—CH=CH—CO—Cl | Cinnamoyl Chloride | 1 |
| ⬡—CO—Cl ⬡—CO—Cl | Phthaloyl Chloride | 2 |
| ⬡⬡—CO—Cl | 1-Naphthoyl Chloride | 2.5 |
| $CH_3O$—$C_6H_4$—CO—Cl | Anisoyl Chloride | 3 |
| Cl—CO—$CH_2$—$CH_2$—CO—Cl | Succinyl Chloride | 3 |
| ⬡⬡—CO—Cl | 2-Naphthoyl Chloride | 3.5 |
| $C_6H_5$—CO—Cl | Benzoyl Chloride | 4 |
| $CH_3$—CH=CH—CO—Cl | Crotonyl Chloride | 4 |
| HC———CH ‖ ‖ HC  C—CO—Cl \O/ | 2-Furoyl Chloride | 4 |
| $C_6H_5$—$CH_2$—CO—Cl | Phenylacetyl Chloride | 4.5 |
| Cl—CO—$CH_2$—$CH_2$—$CH_2$—$CH_2$—CO—Cl | Adipyl Chloride | 5 |
| $C_6H_5$—$CH_2$—$CH_2$—CO—Cl | Hydrocinnamoyl Chloride | 5 |
| Cl—CO—CH=CH—CO—Cl | Fumaryl Chloride | 6 |
| $CH_3$—$(CH_2)_{10}$————CO—Cl | Lauroyl Chloride | 6.5 |
| $C_6H_5$—N=N—$C_6H_4$—CO—Cl | p-Phenylazobenzoyl Chloride | 13 |
| $(NO_2)_2C_6H_3$—CO—Cl | 3,5-Dinitrobenzoyl-Chloride | 20 |

The acyl chloride compounds are particularly suitable because they absorb ultra-violet light very readily and give free radicals very easily, as illustrated by the following:

(1) 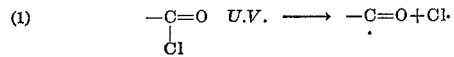

or (2) 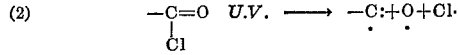

In other words it is possible to obtain two or three free radicals per molecule of compound. In addition, if the remainder of the molecule contains a double bond, such as in cinnamoyl, the ultra-violet is absorbed much faster and the molecule dissociates so rapidly that there is a good chance for free radicals to be formed by resonance at the double bond. It is apparent that the acyl chloride which has an unsaturated side chain attached to a benzene ring is the most reactive (cinnamoyl chloride). Secondly, diacyl chlorides attached directly to the benzene ring in ortho positions are second most reactive. Of the two mono-naphthoyl chlorides tested, the 1-position is more reactive than the 2-position; in addition the naphthoyl chlorides are more reactive than the benzoyl chloride. The length of aliphatic chain (viz. adipyl and lauroyl) does not detract greatly from the effectiveness of the $$\begin{array}{c}-C=O\\|\\Cl\end{array}$$

group. However, when nitro-substituents are placed on the benzene ring to which the acyl group is attached, marked differences in reactivity are noted (viz. benzoyl chloride and dinitrobenzoyl chloride).

As previously mentioned, the catalyst compounds of the new vehicle act to prevent skinning of the vehicle even when a peroxide is included in the vehicle. While we have mentioned benzoyl peroxide as a peroxide additive in the vehicle, other peroxides can be used without appreciably impairing the shelf life of the vehicle.

All of the drying or polymerizing times (in seconds) stated in the previous examples are for freshly prepared samples. It has been observed that after storage of samples for a few months, the drying time is substantially less and is as much as fifty percent less in some cases (that is, the rate of the polymerization reaction under the irradiation increases), and there is no evidence of skinning of the vehicle.

We claim:

1. A method for rapidly indurating a drying oil having a conjugated system of double bonds, which comprises forming a non-aqueous solution of said drying oil and an oil soluble acyl chloride catalyst, forming a film of said solution, and irradiating said film with actinic energy.

2. The method according to claim 1, in which said actinic energy is ultra-violet light.

3. The method according to claim 1, in which said actinic energy is the full spectrum of ultra-violet light.

4. The method according to claim 1, in which said drying oil has a conjugated unsaturation of at least about 30%.

5. A method according to claim 1, in which the catalyst is cinnamoyl chloride.

6. In the art of printing a sheet, the improvement which comprises forming a non-aqueous solution of a drying oil having a conjugated system of double bonds and an oil soluble acyl chloride catalyst, said solution containing a pigment in suspension to form an ink, printing the sheet with said ink, and irradiating the printed surface of the sheet with actinic energy.

7. The improvement according to claim 6, in which said actinic energy is ultra-violet light.

8. The improvement according to claim 6, in which said actinic energy is the full spectrum of ultra-violet light.

9. The improvement according to claim 6, in which said drying oil has a conjugated unsaturation of at least about 30%.

10. The improvement according to claim 6, in which the catalyst is cinnamoyl chloride.

11. A stable non-aqueous quick-drying printing ink, which comprises a drying oil binder having a conjugated system of double bonds, an oil soluble acyl chloride catalyst and a cross-linking agent, said drying oil, acyl chloride and cross-linking agent being in a substantially unreacted form and being adapted to quickly dry when exposed in a thin film to actinic energy.

12. A printing ink according to claim 11, in which the cross-linking agent is divinyl benzene.

13. A stable printing ink comprising a drying oil having a conjugated system of double bonds, an organic peroxide, and an oil-soluble acyl chloride catalyst, said drying oil, peroxide and acyl chloride being in substantially unreacted form and adapted to quickly dry when exposed in a thin film to actinic energy.

14. A printing ink according to claim 13, in which the drying oil has a conjugated unsaturation of at least about 30%.

15. A printing ink according to claim 13, in which the catalyst is present in an amount which is approximately 2–8% by weight of the drying oil.

16. A printing ink according to claim 13, in which the catalyst is cinnamoyl chloride.

17. A stable non-aqueous, quick-drying printing ink comprising a drying oil having a conjugated system of double bonds and cinnamoyl chloride, the drying oil and cinnamoyl chloride being in a substantially unreacted form and being adapted to quickly dry when exposed in a thin film to actinic energy.

References Cited in the file of this patent

UNITED STATES PATENTS

| | | |
|---|---|---|
| 1,346,091 | Hintz et al. | July 6, 1920 |
| 1,439,695 | Doughty | Dec. 26, 1922 |
| 1,818,073 | Long | Aug. 11, 1931 |
| 2,032,554 | Hooft | Mar. 3, 1936 |
| 2,109,774 | Hooft | Mar. 1, 1938 |
| 2,180,342 | Auer | Nov. 21, 1939 |
| 2,195,362 | Ellis | Mar. 26, 1940 |
| 2,322,106 | Auer | June 15, 1943 |
| 2,330,337 | Cupery | Sept. 28, 1943 |
| 2,413,973 | Howk et al. | Jan. 7, 1947 |
| 2,524,862 | White | Oct. 10, 1950 |
| 2,548,685 | Sachs | Apr. 10, 1951 |
| 2,631,944 | Caffery et al. | Mar. 17, 1953 |
| 2,670,483 | Brophy | Mar. 2, 1954 |
| 2,760,863 | Plambeck | Aug. 28, 1956 |
| 2,842,474 | Pratt | July 8, 1958 |
| 2,955,958 | Brown | Oct. 11, 1960 |

FOREIGN PATENTS

| | | |
|---|---|---|
| 618,181 | Great Britain | Feb. 17, 1949 |

UNITED STATES PATENT OFFICE
CERTIFICATE OF CORRECTION

Patent No. 3,050,413                                August 21, 1962

Benjamin L. Sites et al.

It is hereby certified that error appears in the above numbered patent requiring correction and that the said Letters Patent should read as corrected below.

Column 3, line 6, after "of", second occurrence, insert -- a few --; column 4, line 64, for "98%" read -- 96% --.

Signed and sealed this 8th day of January 1963.

(SEAL)
Attest:

ERNEST W. SWIDER
Attesting Officer

DAVID L. LADD
Commissioner of Patents